United States Patent Office 3,056,966
Patented Oct. 9, 1962

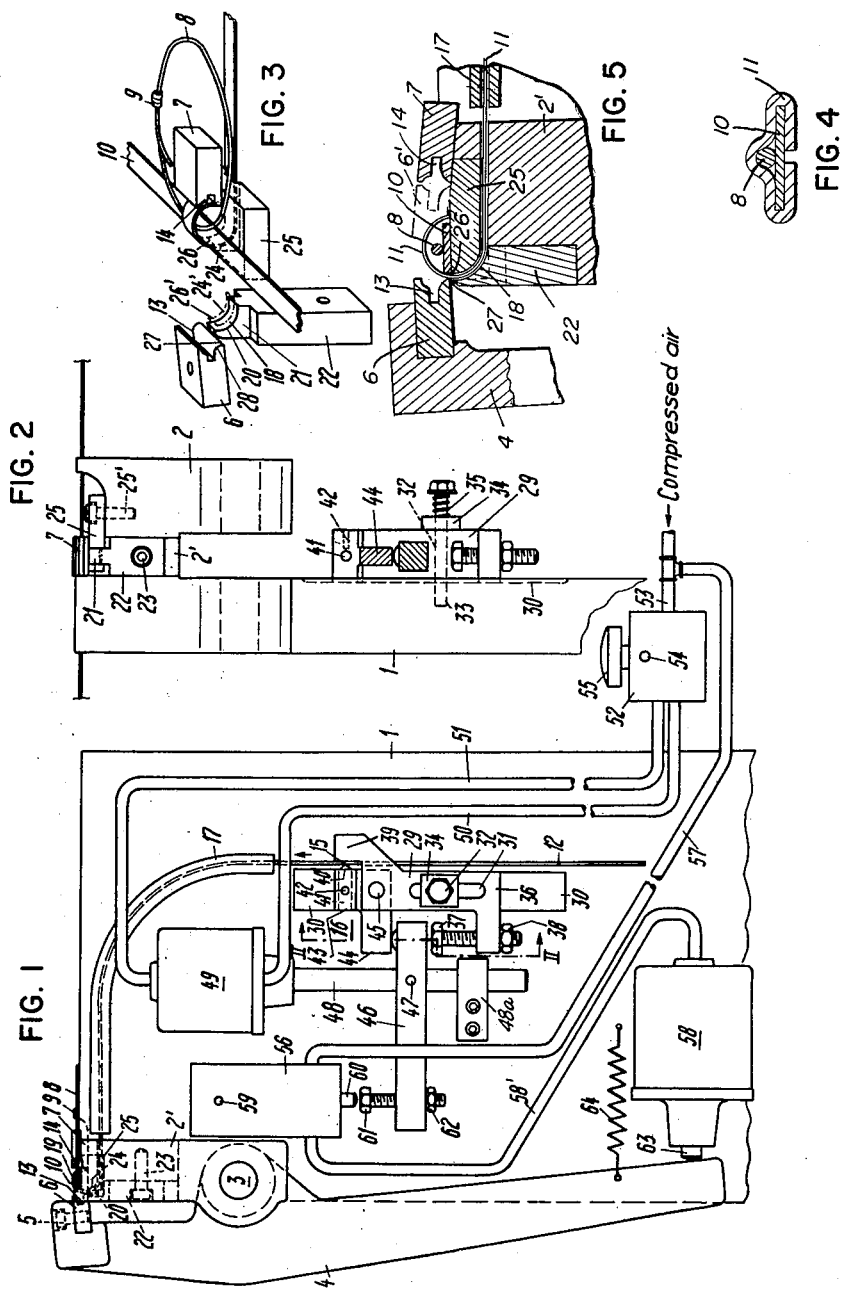

3,056,966
MACHINE FOR CLAMPING TWO WORK PIECES TO ONE ANOTHER
Walter Spühl, 7 Lukasstrasse, Sankt Gallen, Switzerland
Filed Aug. 15, 1958, Ser. No. 755,321
Claims priority, application Germany Aug. 20, 1957
8 Claims. (Cl. 1—177)

The present invention relates to a machine for clamping two work pieces to one another, and has the principal object of providing a machine of this kind, the design and control of which is made simpler and more reliable than hitherto.

With this and other objects in view I provide a machine for clamping two work pieces to one another, comprising in combination: an adjustble feeder device for repeatedly advancing a metal strip or band from a supply thereof, a cutting and forming mechanism comprising a movable jaw member and a stationary jaw member, the movable jaw member being mounted at one end of an actuating lever. The movable jaw member has a knife edge formed thereon which cooperates with a stationary knife edge for cutting off the strip material. There is a bending slot which causes the strip material to curl as it advances to be acted upon by the jaw members.

These and other features and objects of my invention will be more clearly understood from the following description of a preferred embodiment thereof given by way of example with reference to the accompanying drawing, in which:

FIG. 1 is a front elevation of the machine.

FIG. 2 is a fragmentary side elevation of the machine wherein, some parts have been omitted and others are shown in section on the line II—II of FIG. 1.

FIG. 3 is an exploded perspective view on a larger scale.

FIG. 4 shows, on a still larger scale, a cross section of the work pieces clamped to one another.

FIG. 5 is an enlarged vertical section of the parts of FIG. 3 in operative position.

The machine illustrated has an upright 1, which is provided on top with a bearing arm 2 directed firstly horizontally and then downwardly. In the upright 1 and in the bearing arm 2 a pin 3 is journalled, on which a lever 4 is pivotally mounted. At the upper end of the lever 4 the moveable jaw member 6 of a pair of cutting and forming members is fixed by a screw 5. The stationary jaw 7 is fixed to the horizontal part 2' of the bearing arm 2 in a manner not shown in detail.

The machine clamps at each working stroke a wire spring 8 (of which only one turn, knotted at 9, is shown) to a steel band frame 10, of which frame only part of a longitudinal member is shown. The machine in this manner can be used to fabricate mattress springs. The clamp 11 is made in a manner to be described later in more detail from a pliable steel strip 12, and embraces in the finished condition the wire spring 8 and the steel band frame 10 in a convenitonal manner as shown in FIG. 4. The jaws 6 and 7 of the cutting and forming mechanism have two mutually opposite confronting forming slots or incisions 13 and 14 which are profiled corresponding to the two symmetrical halves of the finished clamp 11 embracing the two work pieces 8 and 10.

The strip stock 12 is caught at 15 by a feeder device 16 and advanced in a guide track 17 which deflects the band from the vertical into the horizontal direction and feeds the same into a curved slot 18 (see FIG. 3 and FIG. 5) which effects a curving of the free end 19 of the strip 12 as shown in FIG. 1. The curved slot 18 is bounded below by a concave cylindrical face 20 of a nose 21 of a block 22, which is attached to the horizontal part 2' of the bearing arm 2 by means of a counterbored screw 23.

On top, the curved slot 18 is bounded by a convex cylindrical face 24 formed on the underside of a stationary knife 25, which is fixed by means of a screw 25' on top of the arm 2. For the sake of clarity the face 24 is shown again in chaindotted lines at 24' in FIG. 3 in order to illustrate how the faces 20 and 24 define the curved slot 18 from below and above, respectively. The block 22 is in reality immediately below the stationary knife 25 as shown in FIG. 5 and is drawn in FIG. 3 further to the left only for clarity of illustration. The cutting edge of the stationary knife 25 is denoted by 26 (and 26', respectively), and is located immediately by the side of the cutting edge 27 of a moveable knife 28, which is formed by the lower right hand side portion of the moveable jaw 6 of the cutting and forming mechanism.

The feeder device 16 has a carriage 29 which is slidable in a vertical groove 30 of the upright 1. The carriage 29 has a longitudinal slot 31 through which reaches a screw 32, which is screwed at 33 into the upright 1. The screw 32 passes also through a holder plate 34 which is forced against the carriage 29 by a helical compression spring 35. The carriage 29 is arrested in this manner in its actual position on the upright 1 as long as no displacing force acts on it. At its lower end the carriage has an arm 36, which is provided with an abutment screw 37, secured in its adjusted position by a lock nut 38. On top the carriage has a feeder jaw 39, which co-operates with the point 40 of a feeder pin 41. The feeder pin 41, secured by a clamping screw 42, is located in a corresponding bore of an arm 43 of a bell crank lever 43, 44, the other arm 44 of which serves as an abutment. The bell crank lever 43, 44 is pivotally mounted on the carriage 29 by means of a pin 45.

With the abutments 37 and 44, there co-operates the right hand side end of a transverse piece 46, which is rigidly connected at 47 with a piston rod 48, the piston of which is located in a double-acting cylinder 49. A guide member 48a for the piston rod 48 is connected to upright 1. The cylinder 49 is connected by two compressed air pipes 50, 51 to a four-way valve 52. This valve 52 is connected to a compressed air supply pipe 53, and has an exhaust port 54. A pedal 55 is provided for its operation.

A three-way valve 56 is connected on the one hand to a compressed air supply pipe 57, and on the other hand to a compressed air pipe 58' leading to a single-acting cylinder 58. Valve 56 has an exhaust port 59. For its operation, the valve 56 has a pin 60, which co-operates with an abutment screw 61. The screw is mounted on the left hand side end of the transverse piece 46 and is secured in its adjusted position by a lock nut 62.

The piston (not shown) of the single acting cylinder 58 co-operates, through an abutment 63 fixed on it, with the lower end of the lever 4. Lever 4 is pulled by a return-spring 64 against this abutment 63. It should be noted that in FIG. 2 the lever 4, the cylinders 49 and 58, and the valves 52, 56 with their associated pipes, and other structural details have been omitted.

The machine described operates as follows:

Firstly the steel band frame 10 and the spring 8 to be attached to it are brought into the position illustrated in FIGS. 1 and 3. At this moment the feeder device 16 is not yet in the position illustrated in FIG. 1; rather, the piston rod 48 is lowered, and the transverse piece 46 rests on the guide member 48a and on the abutment screw 37, so that the carriage 29 is in its lower position. The compressed air pipe 50 is then connected by the four-way valve 52 to the exhaust port 54.

When the pedal 55 is depressed into the lower position as shown, the compressed air pipe 50 is connected to the compressed air supply pipe 53, while the compressed air pipe 51 is connected to the exhaust port 54. Consequently the piston rod 48 moves up and the transverse piece 46 carries along the lever arm 44. To the bellcrank lever 43, 44, accordingly a torque is applied in the clockwise sense, so that the mild steel band 12 is forced by the point 40 of the feeder pin 41 firmly against the feeder jaw 39. Since the bell crank lever 43, 44 cannot continue its rotation, the carriage 29 is carried along upwardly, whereby it imparts a feed to the band 12 the magnitude of which can be adjusted by the abutment screw 37.

In FIG. 1 the feeder device 16 is illustrated immediately before the end of the feeder movement. A slight further rise of the piston rod 48 effects the abutting of the screw 61 on the control pin 60 of the three-way valve 56, through which hitherto the compressed air pipe 58' was connected to the exhaust port 59. By the upward movement of the pin 60 now the compressed air pipe 58' is connected to the compressed air supply pipe 57 instead, so that in the single-acting cylinder 58 the piston is moved to the left and accordingly the free end of the piston rod 63 turns the lever 4 in the clockwise sense.

The end 19 of the mild steel band 12 which has been rolled up by the feeder movement in the curved slot 18 and which embraces the two work pieces 10 and 8 to be connected to one another, is now cut off by the moveable cutting edge 27 and the stationary cutting edge 26 of the knife 28 and 25, respectively. The moveable jaw 6 subsequently forces the semi-circular cut-off end 19, together with the work pieces 10 and 8, against the stationary jaw 7. The end 19 of the band is thereby pressed into the two juxtaposed incisions and is deformed into the finished clamp 11 (see FIG. 4). The movable jaw 6 is shown by dotted lines at 6' in FIG. 5 in the closed clamping position coacting with jaw 7.

When the pedal 55 is released, the same is raised by a spring (not shown) into the initial position so that the compressed air pipe 51 is connected to the compressed air supply pipe 53, while the compressed air pipe 50 is connected to the exhaust port 54. The piston rod 48 moves downward and carries along the carriage 29 through the parts 46 and 37 in the downward direction, the pin 41 releasing the mild steel band 12. A spring (not shown) may be provided for turning the bell crank lever 43, 44 in the counter-clockwise sense. The pin 60 returns by spring action into the starting position, and the air contained in the cylinder 58 is exhausted therefrom through the pipe 58' and the exhaust port, since the lever 4 returns into its initial position by the action of the spring 64, and acts on the abutment 63.

After advancing the frame 10 and inserting a new spring 8, the cycle of operations described is repeated.

While I have described herein and illustrated in the accompanying drawing what may be considered a typical and particularly useful embodiment of my said invention, I wish it to be understood that I do not limit myself to the particular details, and dimensions described and illustrated; for obvious modifications will occur to a person skilled in the art.

What I claim as my invention and desire to secure by Letters Patent is:

1. A machine for clamping two work pieces to each other, comprising in combination, an upright support; a feeder device for a pliable band, said device being carried by said support; moveable and stationary jaws, the stationary jaw being carried by said support; a first knife on the moveable jaw; a stationary knife on said support cooperating with the first knife, said stationary knife having a curved face; a stationary block on the support, said block having another curved face; a curved slot being defined between the curved face of the stationary knife and the other curved face of the block; means for supporting the two work pieces between the jaws while a free end of the band is advanced by the feeder device through said slot and is rolled by the curved faces around the two work pieces; and means for moving the moveable jaw and first knife to close the jaws and cut off a length of the band from a free end thereof; the closed jaws having opposed portions shaped to define the profile of a clamp, whereby the closed jaws form the cut-off length of the band into a clamp around the two work pieces.

2. A machine according to claim 1, wherein the curved face of the stationary knife is convex and the other curved face of the block is concave to define said curved slot.

3. A machine for clamping two work pieces to each other, comprising in combination, an upright support; a feeder device for a pliable band, said device being carried by said support; moveable and stationary jaws, the stationary jaw being carried by said support; a first knife on the moveable jaw; a stationary knife on said support cooperating with the first knife, said stationary knife having a curved face; a stationary block on the support, said block having another curved face; a curved slot being defined between the curved face of the stationary knife and the other curved face of the block; means for supporting the two work pieces between the jaws while a free end of the band is advanced by the feeder device through said slot and is rolled by the curved faces around the two work pieces; and means for moving the moveable jaw and first knife to close the jaws and cut off a length of the band from a free end thereof; the closed jaws having opposed portions shaped to define the profile of a clamp, whereby the closed jaws form the cut-off length of the band into a clamp around the two work pieces, the last named means comprising a lever pivotally mounted on said support; a stationary cylinder having axial drive means; an abutment on said drive means cooperating with said lever; a compressed air supply means controllably connected to said cylinder for actuating said drive means by air pressure; and a spring opposing movement of the lever and said drive means; said moveable jaw being mounted on said lever, whereby the jaws are closed when the compressed air in said cylinder causes said drive means to pivot the lever, and the jaws are opened when the spring retracts the lever upon release of air pressure in the cylinder.

4. A machine for clamping two work pieces to each other, comprising in combination, an upright support; a feeder device for a pliable band, said device being carried by said support; moveable and stationary jaws, the stationary jaw being carried by said support; a first knife on the moveable jaw; a stationary knife on said support cooperating with the first knife, said stationary knife having a curved face; a stationary block on the support, said block having another curved face; a curved slot being defined between the curved face of the stationary knife and the other curved face of the block; means for supporting the two work pieces between the jaws while a free end of the band is advanced by the feeder device through said slot and is rolled by the curved faces around the two work pieces; and means for moving the moveable jaw and first knife to close the jaws and cut off a length of the band from a free end thereof; the closed jaws having opposed portions shaped to define the profile of a clamp, whereby the closed jaws form the cut-off length of the band into a clamp around the two work pieces, the last named means comprising a lever pivotally mounted on said support; a stationary cylinder having axial drive means; an abutment on said drive means cooperating with said lever; a compressed air supply means controllably connected to said cylinder for actuating said drive means by air pressure; and a spring opposing movement of the lever and said drive means; said moveable jaw being mounted on said lever, whereby the jaws are closed when the compressed air in said cylinder causes said drive means to pivot the lever, and the jaws are opened when the spring retracts the lever upon release of air pressure in the cylinder; said feeder device comprising a reciprocatable carriage; a feeder member mounted on said carriage; a stationary other cylinder having a piston rod moveable by air pressure in said other cylinder, a bell crank lever pivotally mounted on said carriage, said bell crank lever having a first arm cooperating with said piston rod and having a second arm cooperating with said feeder member; said second arm pressing the band against the feeder member upon an incipient movement of said piston rod; said piston rod bodily moving the bell crank lever and carriage and carrying the band along towards the jaws upon a continued movement of the piston rod.

5. A machine according to claim 4, wherein said carriage has an adjustable abutment cooperating with said piston rod and permitting adjustment of the distance of movement of said carriage.

6. A machine according to claim 4, further comprising arrester means cooperating with the carriage for detaining the same in a starting position.

7. A machine as claimed in claim 4, further comprising a valve in communication with the compressed air supply and with the first named cylinder; said piston rod having an abutment cooperating with said valve to supply the first named cylinder with compressed air towards the end of drive movement of the piston rod and carriage.

8. A machine according to claim 7, further comprising another valve in communication with the compressed air supply and with said other cylinder; and a pedal means controlling said other valve to effect when depressed the drive movement of said carriage; said pedal means when released effecting return of the carriage to its starting position.

References Cited in the file of this patent

UNITED STATES PATENTS

| | | |
|---|---|---|
| 1,512,990 | Lehmann | Oct. 28, 1924 |
| 1,943,546 | Owen | Jan. 16, 1934 |
| 2,537,817 | Edwards | Jan. 9, 1951 |
| 2,575,774 | Spuhl | Nov. 20, 1951 |